(12) United States Patent
Minarik et al.

(10) Patent No.: US 12,056,022 B1
(45) Date of Patent: Aug. 6, 2024

(54) ENHANCED PRIORITIZATION ON DATA PROTECTION ASSETS

(71) Applicant: Dell Products L.P., Round Rock, TX (US)

(72) Inventors: Jennifer M. Minarik, Zionsville, IN (US); Mark Malamut, Aliso Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/159,049

(22) Filed: Jan. 24, 2023

(51) Int. Cl.
*G06F 16/00* (2019.01)
*G06F 11/14* (2006.01)
*G06F 16/28* (2019.01)

(52) U.S. Cl.
CPC ...... *G06F 11/1469* (2013.01); *G06F 11/1461* (2013.01); *G06F 16/285* (2019.01); *G06F 2201/84* (2013.01)

(58) Field of Classification Search
CPC .................................................. G06F 16/122
See application file for complete search history.

(56) References Cited

U.S. PATENT DOCUMENTS

2020/0342000 A1* 10/2020 Savir .................. G06F 11/1471

* cited by examiner

*Primary Examiner* — Ajith Jacob
(74) *Attorney, Agent, or Firm* — Staniford Tomita LLP

(57) ABSTRACT

Embodiments for a data protection method of prioritizing data assets for backup operations. A base priority of data assets operated on by the backup system is first determined as defined by certain characteristics, along a defined scale. The process then prioritizes certain data assets using priority tagging, grouping factors, and metadata modifiers to generate an interim net priority. If any assets have the same prioritization value, other asset attributes are used to further prioritize any tied assets. The process then performs a priority response action, such as notifying the user (normally or urgently) based on the asset prioritization. The backup/restore operations are then performed on the data assets in an order based on the final prioritization values.

20 Claims, 10 Drawing Sheets

| OBJECT NAME | BASE PRIORITY (1 = highest) | PRIORITY TAG | NET PRIORITY |
|---|---|---|---|
| Finance Group | 20 | Elevated Priority | 5 |
| Organization Assets | 20 | -- | 20 |
| Test VM | 20 | Low Priority | 40 |

| OBJECT NAME | BASE PRIORITY (1 = highest) | ASSET PRIORITY MODIFIER | NET PRIORITY |
|---|---|---|---|
| Critical Infrastructure Server | 5 | -1 | 4 |
| Finance Group | 5 | 0 | 5 |
| Test Data Server | 5 | +1 | 6 |

800

| OBJECT NAME | BASE GROUP PRIORITY LABEL (1 = highest) | PRIORITY MODIFIER | GROUPING | NET PRIORITY |
|---|---|---|---|---|
| Critical Infrastructure Server | 5 | -1 | -- | 4 |
| Critical SQL DB | 5 | -1 | -- | 4 |
| SQL DB Transaction Log | 5 | 0 | -1 (paired with Critical SQL DB) | 4 |
| Finance Group | 5 | 0 | -- | 5 |
| Test Data Server | 5 | +1 | -- | 6 |

FIG. 8

| OBJECT NAME | BASE GROUP PRIORITY LABEL | PRIORITY MODIFIER | INTERIM NET PRIORITY | TIE-BREAKER FACTOR | NET PRIORITY AFTER TIE-BREAKER |
|---|---|---|---|---|---|
| ASSET A | 20 | 0 | 20 | Last backup 1 day ago 50 copies available | 20.2 |
| ASSET B | 20 | 0 | 20 | Last backup 30 day ago 3 copies available | 20.1 |
| ASSET C | 30 | 0 | 30 | -- | 30 |

1100

| PRIORITY TIER | ACTION | PRIORITIZATION THRESHOLD |
|---|---|---|
| Tier 3 (base priority and lower) | Continue Standard Notifications. Includes alert in the console and part of a consolidated alert e-mail at end of day | >10 |
| Tier 2 (minor elevated priority) | Includes notification/alert in the console and immediate alert e-mail on occurrence | 3-10 |
| Tier 1 (major elevated priority) | Includes Tier 2 behavior and SMS message/phone call to admin | <3 |
| Customized | Define by User | Configurable |

FIG. 11

Tiers of Notification 1200

Number of Tiers
3

Define thresholds
1202

Tier 1
Threshold <3

Tier 2
Threshold 3-10

Tier 3
Weight >10

Actions: Tier 3
Email at end of day

Actions: Tier 2    1204
Immediate email

Actions: Tier 1
Immediate SMS

Submit

ENHANCED PRIORITIZATION ON DATA PROTECTION ASSETS

TECHNICAL FIELD

This invention relates generally to data backup systems, and more specifically to prioritizing data assets for backup based on defined asset characteristics.

BACKGROUND

Backup software is used by organizations to store their data for recovery after system failures, routine maintenance, archiving, and so on. Backup sets are typically taken on a regular basis, such as hourly, daily, weekly, and so on, and can comprise vast amounts of information embodied as 'data assets.' Depending on the size and type of organization, such data typically comprises very large amounts of information of various types and characteristics, such source, storage requirements, sensitivity/importance, and so on.

Backup programs are often provided by vendors that provide backup infrastructure (software and/or hardware) to customers under service level agreements (SLA) that set out certain service level objectives (SLO) that dictate minimum standards for important operational criteria such as uptime and response time, etc. To provide adequate data protection, dedicated backup administrators are usually tasked with managing backup operations and applying appropriate backup policies to specific data assets.

In present data protection environments, individual data assets are all treated equally in terms of backup procedures and policies. That is, all assets within a policy are backed up in the order they come in with no preference given to any particular item. In an artificial test or lab environments this is sufficient, but in actual deployment there are different priorities across assets and not properly honoring these priorities can have dire consequences, such as missing backup windows on certain critical data.

What is needed, therefore, is a data asset protection system that allows priority levels to be associated with user or system defined characteristics of the assets. Such an approach allows assets to be assigned a specific priority and enables higher priority assets to be elevated in a backup queue.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 8 is a table that lists the net priority for grouped data assets, under an example embodiment.

FIG. 11 is a table that illustrates examples of escalated alerting as types of actions, under an example embodiment.

FIG. 12 is an example user interface display area for defining notification alerts as an action, under an example embodiment.

FIG. 13 is an example GUI display area for defining metadata modifiers, under an example embodiment.

DETAILED DESCRIPTION

Figure 1:
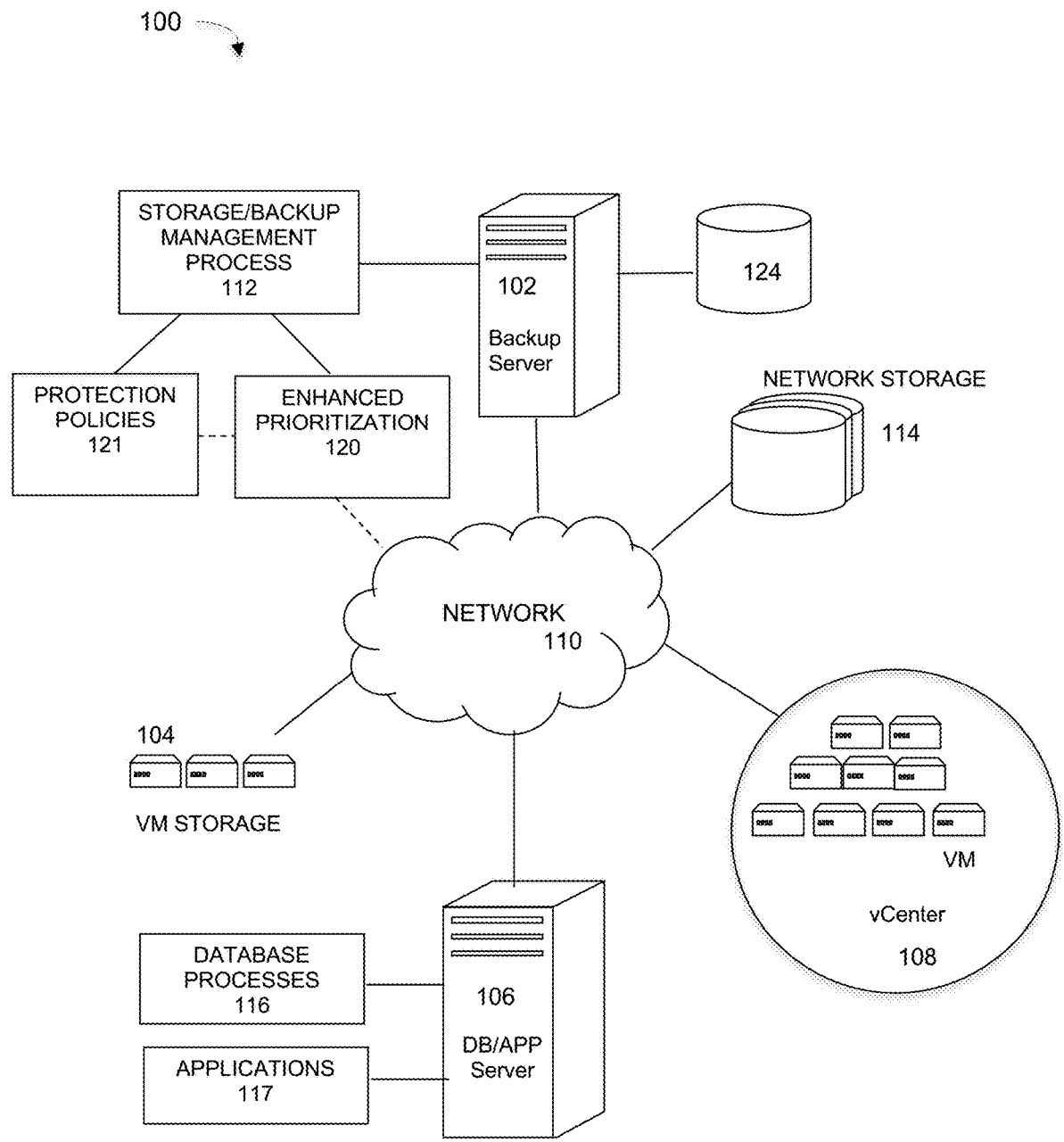
FIG. 1 illustrates a data protection system implementing enhanced prioritization on data assets, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a data asset protection system that allows priority levels to be associated with user or system defined characteristics of the assets (e.g., priority tags, metadata, grouping, replication factor, etc.). This method allows assets to be assigned a priority and enables higher priority assets to be elevated in the backup queue. The system can look at asset characteristics (e.g., tags) and determine how this information may affect the priority of an asset. For example, an asset may have a set base priority that can be elevated with modification due to having critical personal identification information (PII) information on it to a higher net priority, further modification can determine tiebreakers to determine if that asset goes into the queue before or after other assets with the same net priority values. Additionally, higher prioritization can trigger heightened notification in the event of a failures. Using these methods a user can set a common backup policy for all assets, and any issues with higher priority assets will be escalated quickly and above the noise of other lower priority assets.

FIG. 1 illustrates a data protection system implementing enhanced prioritization on data assets, under some embodiments. In system 100, a backup server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The VMs or other network storage devices serve as target storage devices for data backed up from one or more data sources, such as a database or application server 106, or the data center 108 itself, or any other data source, in the network environment. The database server can be a single machine or a cluster. The data sourced by the data source may be any appropriate data, such as database 116 data that is part of a database management system or any appropriate application 117. Such data sources may also be referred to as data assets and represent sources of data that are backed up using process 112 and backup server 102.

The network server computers are coupled directly or indirectly to the network storage 114, target VMs 104, data center 108, and the data sources 106 and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may comprise at least part of a Data Domain Restorer (DDR)-based deduplication storage system, and storage server 102 may be implemented as a DDR Deduplication Storage server provided by Dell Corporation. However, other similar backup and storage systems are also possible.

Backup software vendors typically provide service under a service level agreement (SLA) that establishes the terms and costs to use the network and transmit/store data specifies minimum resource allocations (e.g., storage space) and performance requirements (e.g., network bandwidth) provided by the provider. The backup software may be any suitable backup program such as EMC Data Domain, Avamar, and so on. In cloud networks, it may be provided by a cloud service provider server (e.g., Amazon, EMC, Apple, Cisco, etc.).

In most large-scale enterprises or entities that process large amounts of data, different types of data are routinely generated and must be backed up for data recovery purposes. To optimize storage costs and data availability, such backup processes are often dictated by several different data protection (backup) policies 121 applied to different types or classes of data. These policies define important parameters such as backup periods (e.g., daily, weekly, monthly, etc.), storage targets (e.g., local fast storage, network hard drive, cloud archive, etc.), retention times (e.g., 2/5/10 years, etc.), transfer priority, user access, and other similar parameters.

For the embodiment of FIG. 1, the enhanced prioritization process 120 provides a dynamic and efficient method of allowing priority levels to be associated with user or system defined characteristics of the assets to enable these assets to be re-prioritized (up or down) in a backup queue. The solution provides: (1) enhanced prioritization that is both user-based and system-based, and (2) a priority response that is both user-based and system-based.

For the embodiment of FIG. 1, the enhanced prioritization process 120 may be implemented as a component that runs within a data protection infrastructure, and can be run as an independent application or embedded into an instance of data protection software 112 or a data protection appliance. Process 120 may provide input directly to the backup process 112 to perform actions on data assets that are also accessed or provided within the backup software 112. Alternatively, it may act directly on the protection policies 121 to dictate which policies are applied by the backup software for the respective assets. Any of those implementations may also be on-premise implementations on client machines within a user's data center or running as a hosted service within the cloud (e.g., network 110).

The data assets can comprise any dataset or source of data that a user wants to backup for data protection (i.e., data backup, storage and/or recovery/restoration) purposes. Such assets can be individual files, file directories, file systems, databases, database servers, data processing applications, Virtual Machines (VMs), and so on. Such assets may be defined by their source or by the applications that process the data, as well as other characteristics, such as storage or data type, priority (criticality), protection requirements, user access, and other relevant parameters.

Figure 2:
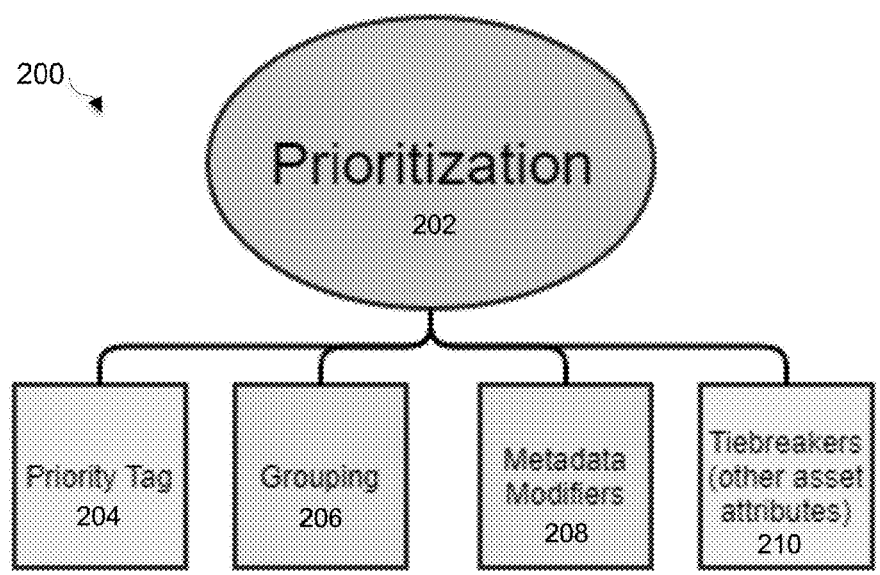
FIG. 2 illustrates different prioritization schemes for data assets, under some embodiments.

The enhanced data asset prioritization process 120 first sets the priority on an asset or group of assets, either directly through user intervention or indirectly through system intervention. There can be several different mechanisms to set/determine the prioritization configuration of a particular data asset. FIG. 2 illustrates different prioritization schemes for data assets, under some embodiments. In diagram 200 of FIG. 2, the prioritization 202 can be set by at least one several configuration mechanisms that are recommended for a system, these including, but not limited a priority tag 204, metadata modification 208, grouping of related assets 206, and other asset attributes (e.g., replication factor), 210.

The prioritization factor 202 represents an enhanced prioritization value that gives weights to the various assets so that data with higher weights are prioritized within the system and by the backup process 112 and moved ahead in process (backup) queues or elevated in alert notifications. An administrator console (explained in greater detail below) allows users to assign priorities to individual assets or groups of assets.

The enhanced prioritization process 120 computes the net priority of an asset to determine its placement in the backup priority queue. The net priority is made up of three components: priority tag (which is the value for a base or default priority) 204, grouping 206, and metadata modifiers 208. In the case of assets that have the same net priority, certain attributes 210 of an asset (e.g., replication factor) would be used as tiebreakers to break the tie.

Figure 3:
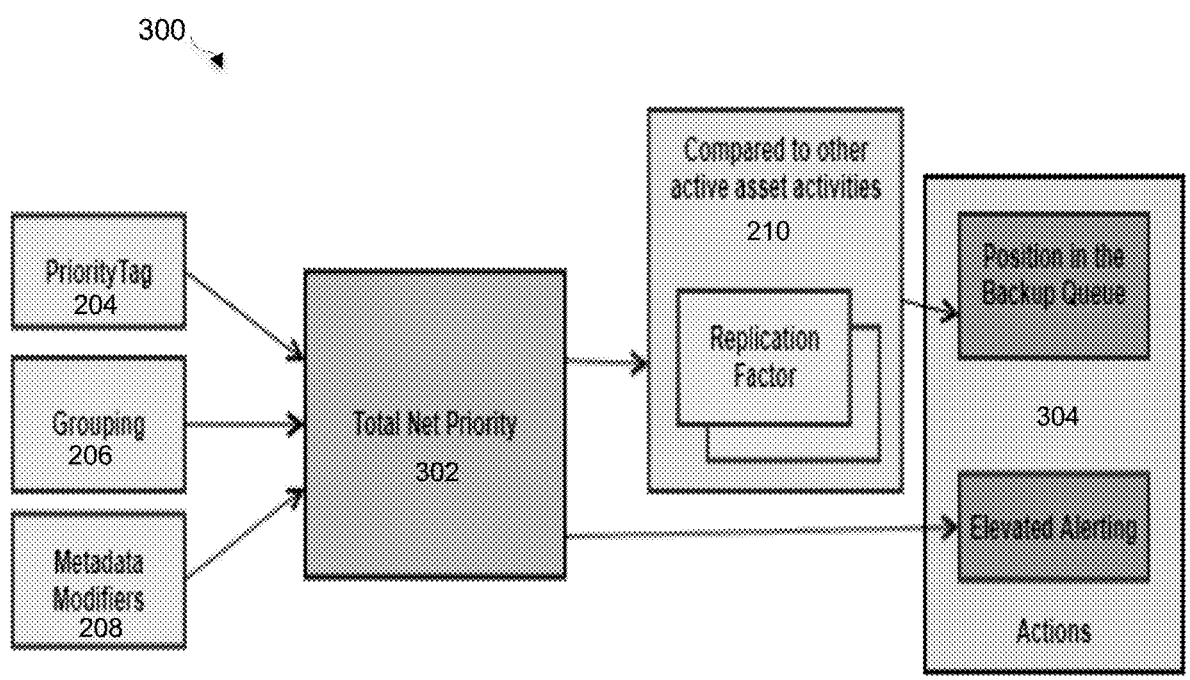
FIG. 3 illustrates the determination of a total net priority and resulting actions for an enhanced prioritization process, under some embodiments.

FIG. 3 illustrates the determination of a total net priority and resulting actions for an enhanced prioritization process, under some embodiments. As shown in diagram 300, and as mentioned above, the total net priority value 302 is calculated by the base value provided by the priority tag 204 and as modified by the grouping factor 206, and metadata modifiers 208. The total net priority value 302 is then further modified by the attributes value or values 210 in the event of any tie-break or other decision relative to priority above or below other data assets. Such attributes can include replication factor (as shown), or other similar attributes.

The total net priority 302 or the attribute 208 modified total net priority is then used to determine one or more actions 304 performed on the data asset. Such actions can include changing the data asset's position in the backup queue, or providing elevated alerting for the data asset. For the embodiment illustrated in FIG. 3, the elevated alerting action 304 is performed based on the total net priority value 302 alone, while the backup queue position is determined by the total net priority value and the attribute value 210 in the case of a tie-break or similar situation.

In an embodiment, each data asset is assigned or associated with a base priority value. Such a priority value can be any value along a real numeric value, such as 1-100 (with 1 being the highest priority). The range may also be defined in terms of familiar descriptors, such as urgent/high/medium/low, red/yellow/green, and so on. Any number of prioritization levels within a defined range are possible, such as 5, 10, or 20 discrete prioritization levels, and so on.

Assets can be tagged with priority levels outside of the base priority by attaching a priority tag 204. This can be done on either the asset itself from an inventory page (or similar) or an asset groups page. From an administrator console or other graphical user interface (GUI), a user may elevate or de-elevate prioritization of a particular asset.

Given the disparate composition of assets from various sources in system 100, certain data assets may comprise data with different base priority values. In this case, a combination of prioritization may occur. For example, a user can set a global priority, a group level, sub-group, or asset level priorities. In the case of layered or composite priority tags, the most granular priority level will be active on the asset.

Figures 4, 5:
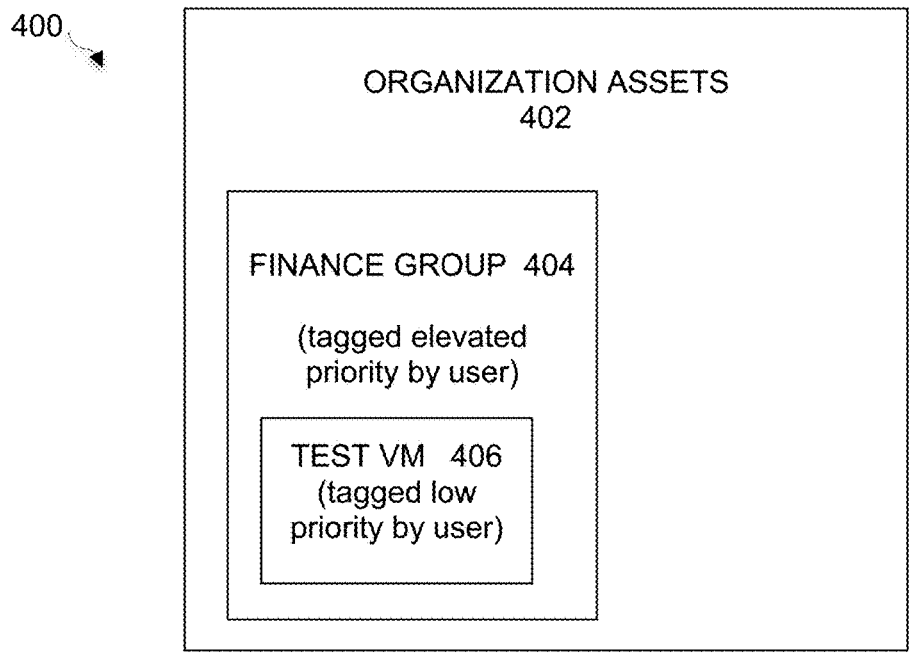
FIG. 4 illustrates a system having different data sources having assets with different base priorities, under an example embodiment.
FIG. 5 is a table that lists the net priority for the data assets in the system of FIG. 4, under an example embodiment.

FIG. 4 illustrates a system 400 having different data sources having assets with different base priorities, under an example embodiment. For the example of FIG. 4, the organization assets 402 include a finance group 404 which, in turn, contains a test VM 406. The data assets within the organization assets 402 may all be assigned a base priority, such as 20 on any appropriate scale 1 to n, such as a scale of 1-50 (or similar scale, in order of decreasing importance). In this case, the data within the finance group 404 and test VM 406 are also assigned this base priority value. However, as shown in FIG. 4, the data of the finance group 404 is tagged as elevated (or higher) priority by the user, while the Test VM data is tagged as low priority by the user.

FIG. 5 is a table 500 that lists the net priority for the data assets in system 400 of FIG. 4, under an example embodiment. Table 500 lists the object name for each data source as Finance Group, Organization assets and Test VM. The base priority for each is set at 20 along a linear scale that is able to mathematically increase or decrease priorities (as mentioned above), with '1' the highest priority. The user or system can tag data for an object or data source with a priority tag, such as 'elevated priority' for the finance group and 'low priority' for the test VM. This tag either raises or lowers the priority of the corresponding data assets. Priority tags are assigned a modifier value such as "Elevated Priority"=−15 and "Low Priority"=+20. When an asset's priority tag matches one of these tags, the net priority of the asset is adjusted using the modifier value assigned to the priority tag to conform to the following equation:

Net Priority Value=Base Priority Value+Priority Tag Modifier Value.

For the example of FIG. 5, there is a global base priority level of 20, while the "Finance Group" is tagged with "Elevated Priority", giving it elevated priority (e.g., 20-15=5) of backups for assets. At an individual asset level the "Test VM" could be tagged "Low Priority" and it would have lower priority (e.g., 20+20=40) than other organizational assets, which are left untagged, and hence maintain a priority level of 20, as shown in table 500. The priority tags thus modify the base priority level by overriding or combining with the base tag to raise or lower the base priority generating a net priority for the corresponding object data.

As shown in FIGS. 2 and 3, another way to set the net priority is through metadata modifiers 208. Metadata modification focuses on protecting data more intelligently and automatically, so data that is more important is protected first with minimal user intervention. In an embodiment, the metadata modification elements can include: tags (e.g., critical, test, PCI, PII, etc.), asset name, storage location, originator/owner, asset type, and so on. These prioritization metadata modifiers would go across asset dimensions to create a prioritization matrix. For example, system prioritization could search for particular metadata (like tags) that would modify prioritization automatically.

Thus, as shown in FIG. 2, all four prioritization attributes (204, 206, 208 and 210) are used to determine the net priority. The "Low" and "Elevated" priorities are part of metadata modifiers 208 along with any other metadata as described below. Each asset has a base priority value, which can then be modified by the group it belongs to (e.g. "finance"), and then further modified by metadata (e.g., low/elevated/test, owner, etc.). Finally a tie-breaker modifier will be applied for assets that are have the same priority value. In general, the modifier value for the tiebreaker factor 210 is relatively small or fractional) (e.g. 0.1) where the other modifiers (204, 206, 208) will be specified in an integer value.

In this case, besides explicit priority tags 204, the metadata modification 208 could use generic tags and leverage them to potentially effect priority (e.g., "Development", "C level machines", "production", "test", "HIPPA", etc.). These generic tags would not directly impact base priority, but would instead serve as a modifier to compute the net priority. Another example of metadata modification, would involve elements of the asset name. For example, if the word "Critical" appeared in an asset name, then the priority system could apply a modifier to elevate that asset 1 or more levels in priority. Using the above example, if there is a particular server within the finance group called "Critical Infrastructure Server" the prioritization system would detect the word "Critical" in the asset name and apply that a modifier value (e.g., -1 or -2 priority level) to the asset priority. Similarly, the system could detect the term "Test" in a server named "Test Data Server" and de-elevate it's level of priority. In this example, the Finance group data in general receives higher priority with the exception of these two assets which have more granular priority tags based on metadata modifications. This functionality computes a net priority for each asset which is used to define the backup order of objects.

Figures 6, 7:
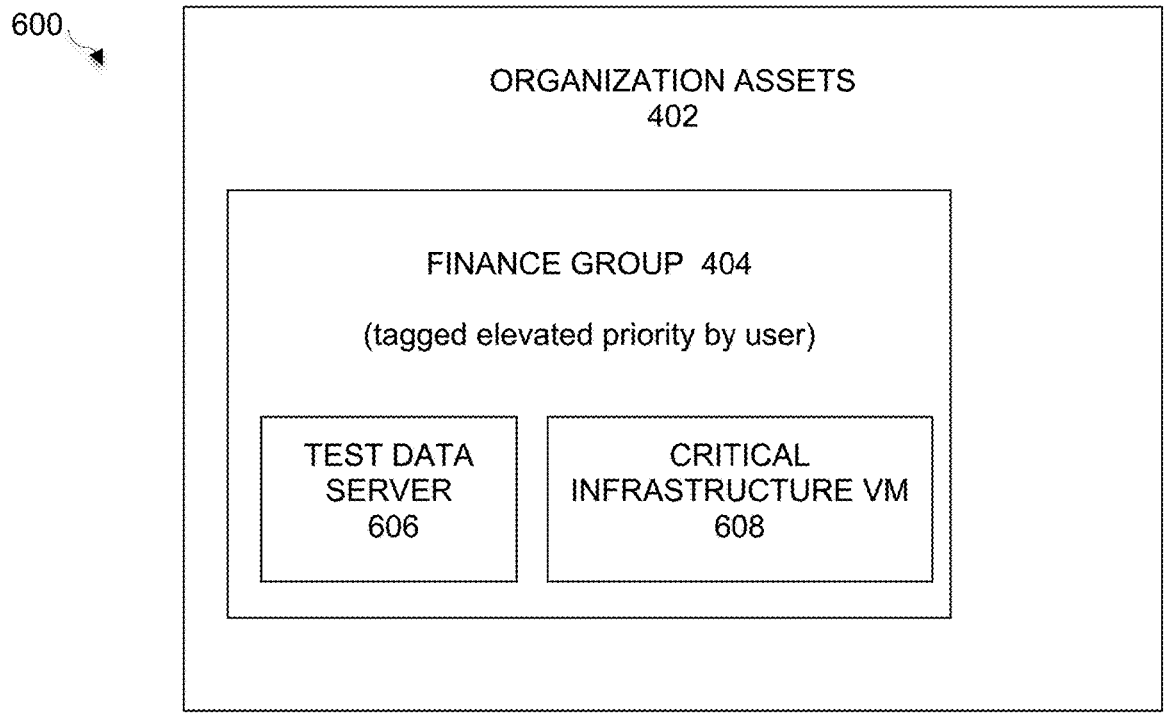
FIG. 6 illustrates the system having metadata modified data assets, under an example embodiment.
FIG. 7 is a table that lists the net priority for the data assets in the system of FIG. 6, under an example embodiment.

FIG. 6 illustrates the system having metadata modified data assets, under an example embodiment. System 600 of FIG. 6 corresponds to system 400, but with the finance group 404 of the organization assets 402 including a test data server 606 and a critical infrastructure VM 608. As mentioned above, the presence of the words "test" and "critical" as the names of these assets automatically causes a modification of their priority values. FIG. 7 is a table 700 that lists the net priority for the data assets in system 600 of FIG. 6, under an example embodiment. In this case, they each start with a base priority value of '5', as per the 'elevated priority' tag and resulting net priority shown in FIG. 5. This base priority level is then modified by the asset priority modifier assigned by virtue of the object name. In this case the critical infrastructure server 608 is given a -1 modifier and the test data server is given a modifier of +1, while the overall finance group stays at the elevated base priority of 5. This results in a net priority of 4, 5, and 6 respectively for the critical infrastructure server, finance group, and test data server, as shown in table 700. Given that a lower priority level means a relatively higher priority, the critical infrastructure server data is prioritized over the test data server and other data of the finance group with respect to backup and restore operations.

FIG. 7 illustrates the case of asset priority modification based on asset name, and specifically certain recognized strings in an asset name. Any appropriate string or text within a name can be defined as recognized for the purpose of priority modification (e.g., critical, confidential, important, archive, test, etc.) based on system configuration and user preferences.

Furthermore, as mentioned above, other metadata elements (besides asset name) can be used to modify the asset priority, such as location, ownership, type, and so on. For example, data assets owned by certain personnel, such as executives, may be escalated in priority over other personnel classes. Likewise, data stored in headquarter servers may be prioritized over other locations, or sensitive financial/legal documents may be prioritized over other types of data, and so on.

With respect to the metadata elements (tags, name, location, ownership, etc.), the software code of each asset contains certain metadata elements or data fields that identify and define the asset. Because enterprise data inherently comes from many disparate sources, data field and naming conventions can vary widely across all the different data assets. A parser may be used to identify relevant terms that help identify data assets, as well as the asset characteristics. For example, terms such as "Production" or "prod," "Test," "database" or "db," "Oracle," "SQL," and so on, indicate data elements that the parser would recognize as being data assets to be protected by certain protection policies. Such characteristics are typically embodied as metadata of the asset, as opposed to the actual data itself. In an embodiment, prioritization process 202 extracts the asset metadata using recognizable terms identifying a data asset and its relevant characteristics.

With respect to asset priority modification, various different assignments can be formulated to correlate the characteristic (e.g., name, location, ownership, type, etc.) with the amount and direction of modification. The example of FIG. 7 used +1 step increments from a base priority level, but any other step may be used depending on the priority values and scales that are used.

As further shown in FIGS. 2 and 3, yet another way to modify the priority of data is through grouping factors 206. In an embodiment, prioritization of data assets can occur at any practical or desired granular level such as file-level, database-level, or namespace. Any such granularity may capture only some of the desired or necessary data due to differences in naming, location, ownership, etc. The grouping mechanism 206 accommodates the fact that data assets may be interrelated through certain dependencies that affect backup and restore operations. That is, a successful backup depends on and must ensure that all required data for a saved dataset is available, as some data may be unusable without related backup files. For example, for backing up SQL databases, the system needs a SQL DB and the SQL transaction log for a successful recovery. In this case, if a SQL DB is marked high priority there should be an automatic grouping from the data protection console to elevate the priority of the SQL transaction log at the same time. The same occurs for clustered systems and other types of assets that should be elevated at the same priority to ensure that all required data is available to recover the critical object.

FIG. 8 is a table 800 that lists the net priority for grouped data assets, under an example embodiment. Per the example mentioned above, the critical infrastructure server may have SQL database data comprising a critical SQL database and SQL database transaction log, as listed as objects in table 800. In this case, the critical SQL database data is assigned a base group priority level of '5' due to being in the Finance group, and has a priority modifier of −1 due to having the word "critical" in its object name. For the example of FIG. 8, the SQL DB transaction log is not modified the same way as the Critical SQL DB data, however, it is needed to be closely linked with the data for backup and recovery purposes. Using the grouping mechanism 206, a grouping modifier of −1 is assigned to the SQL DB transaction log so that it has the same net priority (i.e., '4') as the Critical SQL DB data. The grouping mechanism thus allows priority modification based on logical data groups to break or modify any granularity imposed by the system, or other user configurable parameters.

As shown in FIG. 2, other asset attributes 210 may be used to further modify the prioritization of data assets in a backup queue or other backup/restore component. As further shown in FIG. 3, once the total net priority 302 of a data asset is determined, these other asset attributes 210 are used for comparison with other assets that may have the same net priority value so that a non-random process can be used to determined absolute priority among these identically prioritized assets.

In an embodiment, the other asset attributes include factors such as replication factor, date of last backup, and so on. These values are used to modify a net priority if multiple assets have the same net priority to help make a tie-breaker decision to prioritize tied assets. That is, if two assets come in both with identical net priority then the system will look at these other attributes in order to break the tie. The system can look at multiple attributes such as replication factor or date of last backup, among other factors.

Figures 9, 10:
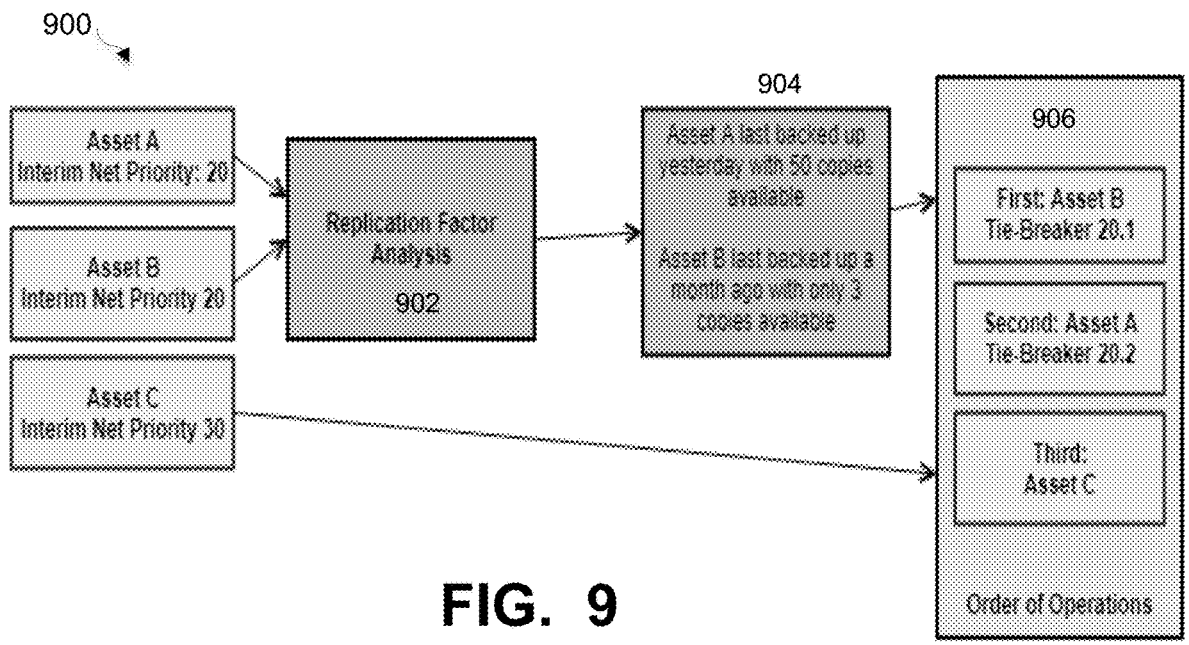
FIG. 9 illustrates the use of other asset attributes to determine net priority among assets with tied priority values, under an example embodiment.
FIG. 10 is a table that lists the final net priority for the data assets in the system of FIG. 9, under an example embodiment.

FIG. 9 illustrates the use of other asset attributes to determine net priority among assets with tied priority values, under an example embodiment. For the example of FIG. 9, Three Assets denoted A, B, and C, have net priority values of 20, 20, and 30, respectively. These represent 'interim' net priorities as other asset attributes need to be used to break any ties, in this case between Asset A and Asset B. For this embodiment, a replication factor analysis process 902 looks at certain replication factors, such as date/time of last backup and number of available copies. The analysis block 904 indicates that for this example, if Asset A has been backed up yesterday and has 50 copies to recover from, and Asset B was last backed up a month ago and only has 3 copies to recover from. In this case, Asset B will be prioritized for over Asset A, which will be prioritized over Asset C, as shown by the order of operations 906. The analysis process 902 is only applied when there is a tie between net priority values, thus Asset C had no tie breaker analysis needed.

Although FIG. 9 illustrates replication factor as the tie-break analysis factor, any other relevant or appropriate factor may be used (e.g., recency of last file changes, delta in data size since last backup, etc.). The example embodiment of FIG. 9 uses the number of days since the last backup and the number of copies available as two different tie-breaker attributes. Other attributes or combinations of attributes may also be used.

The order of operations 906 represents the backup queue for each of the three assets (lowest priority to highest priority). The backup queue order may be based on any appropriate set of rules or policies. For example, oldest backup first, smallest backup size first, and so on, with appropriate weighted combinations for multiple factors. The tiebreaker formula will take this set of attributes (e.g., days since last backup), and assign each a value to be weighted in the overall tie-break factor (e.g., each 1 day since backed could add 0.01 to the net priority). That is, the tiebreaker formula will be defined by the administrator, who can pick from a set of attributes (e.g., days since last backup), and the amount to apply per value (e.g., each 1 day adds 0.01 to the net priority).

FIG. 10 is a table 950 that lists the final net priority for the data assets in system 900 of FIG. 9, under an example embodiment. As shown in the example of FIG. 10, the three assets start with the base priority levels of 20, 20, and 30 for Assets A, B, and C. These are unmodified by tags or other priority modifiers, so they stay as the respective interim net priority values. A tie-breaker is required for Assets A and B, as shown in FIG. 9, and the analysis component yields a final priority and order of operations as Asset B, Asset A, and Asset C, as shown in 906 of FIG. 9.

The second major part of prioritized responses is the actions due to enhanced prioritization. As shown in FIG. 3, certain actions 304 are taken to change the order of the backup/restore/recovery actions to allow higher weighted data assets or asset groups to be elevated in the queue. The system also acts to elevate other required assets when needed to the same level of prioritization to ensure usable backups (i.e., grouping) and to make the decision on which asset to elevate based on tie breaker attributes (if otherwise weighted equally).

Additionally, enhanced prioritization can be used to provide escalated levels of alerts or notifications due to issues with higher priority assets.

FIG. 11 is a table 1100 that illustrates examples of escalated alerting as types of actions, under an example embodiment. For this example, the user has configured priority response based on three levels. All Tier 3 (base priority) assets continue on the standard notification manner (e.g., a notification/alert in the console and part of a consolidated alert email at the end of the day). Higher prioritization alerts for Tier 2 and Tier 1 priorities include increasingly higher immediacy triggers, such as immediate emails or messages/calls to an administrator. These elevated notifications can be limited to only high priority assets to reduce system resource usage, and provide emergency notifications only in the case of truly important assets.

The actions described above involve sending messages and alerts to users and administrators based on changes of prioritization of data assets. Many other actions can also be taken, such as posting to a Slack, Teams, or RSS feed or channel, or triggering a new event.

In an embodiment, the actions and values that trigger these actions can be set by the user through user configurable settings. FIG. 12 is an example graphical user interface (GUI) display area for defining notification alerts as an action, under an example embodiment. The example GUI display area 1200 of FIG. 12 corresponds to the values defined in table 1100 of FIG. 11. For example, the number of tiers can be set by the appropriate command area 1201. The prioritization values set in the prioritization threshold column of table 1100 can be set by a slider GUI component 1202, and actions can be defined in an actions section 1204.

FIG. 12 is provided for purposes of example only, and many other configurations and GUI elements can be used to provide user input to define actions.

Figure 13:
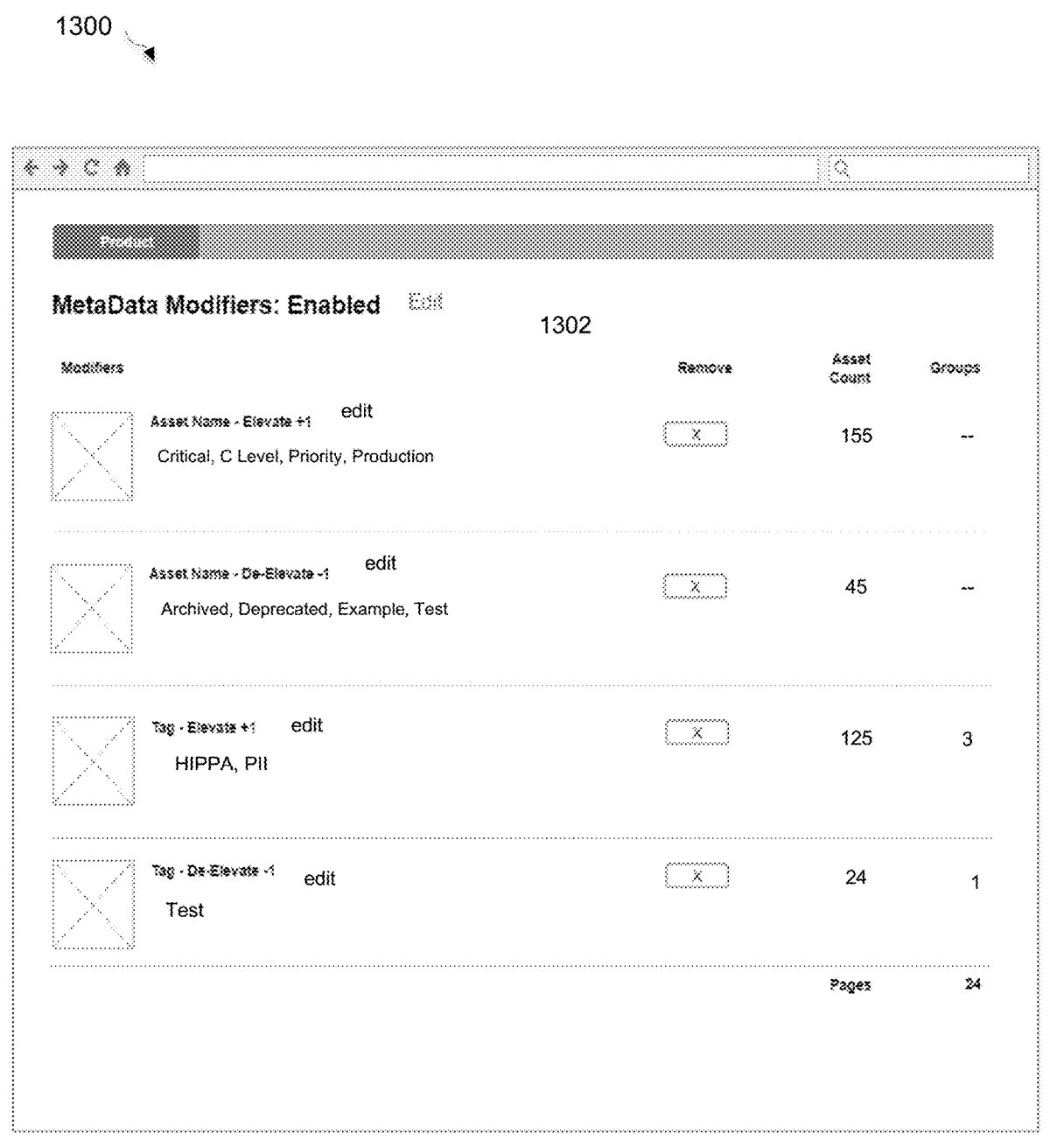

Similar GUI interfaces can be provided to allow the user to specify and input other relevant factors for the system. Such as, for example, the metadata modifiers 208. FIG. 13 is an example GUI display area for defining metadata modifiers, under an example embodiment. A set of default metadata modifiers can be provided in the user console based on best practices. These modifiers elements would include, though not limited to: Tags, Asset Name, Location stored, Originator/Owner, and Asset Type. The user could modify any or all of the individual modifications or alternatively disable/enable the use of modifiers entirely. The purpose of metadata modification is to protect data more intelligently and automatically, so that important key data is prioritized within the data protection system. It is important to note that all backups that come in will be processed as time allows, the same as they would in typical operation, the use of metadata modifiers helps ensure that key data assets are backed up (or restored) more promptly to avoid backup window issues or other time/space constraints.

As shown in FIG. 13, a metadata modifier display area 1302 lists certain defined modifiers, such as Asset Name and Tag. Certain command areas allow the user to select various features of these modifiers as shown, including the granularity of the modification step (e.g., +1), and so on. FIG. 13 is provided for purposes of example only, and many other configurations and GUI elements can be used to provide user input to define the metadata modifiers.

Figure 14:
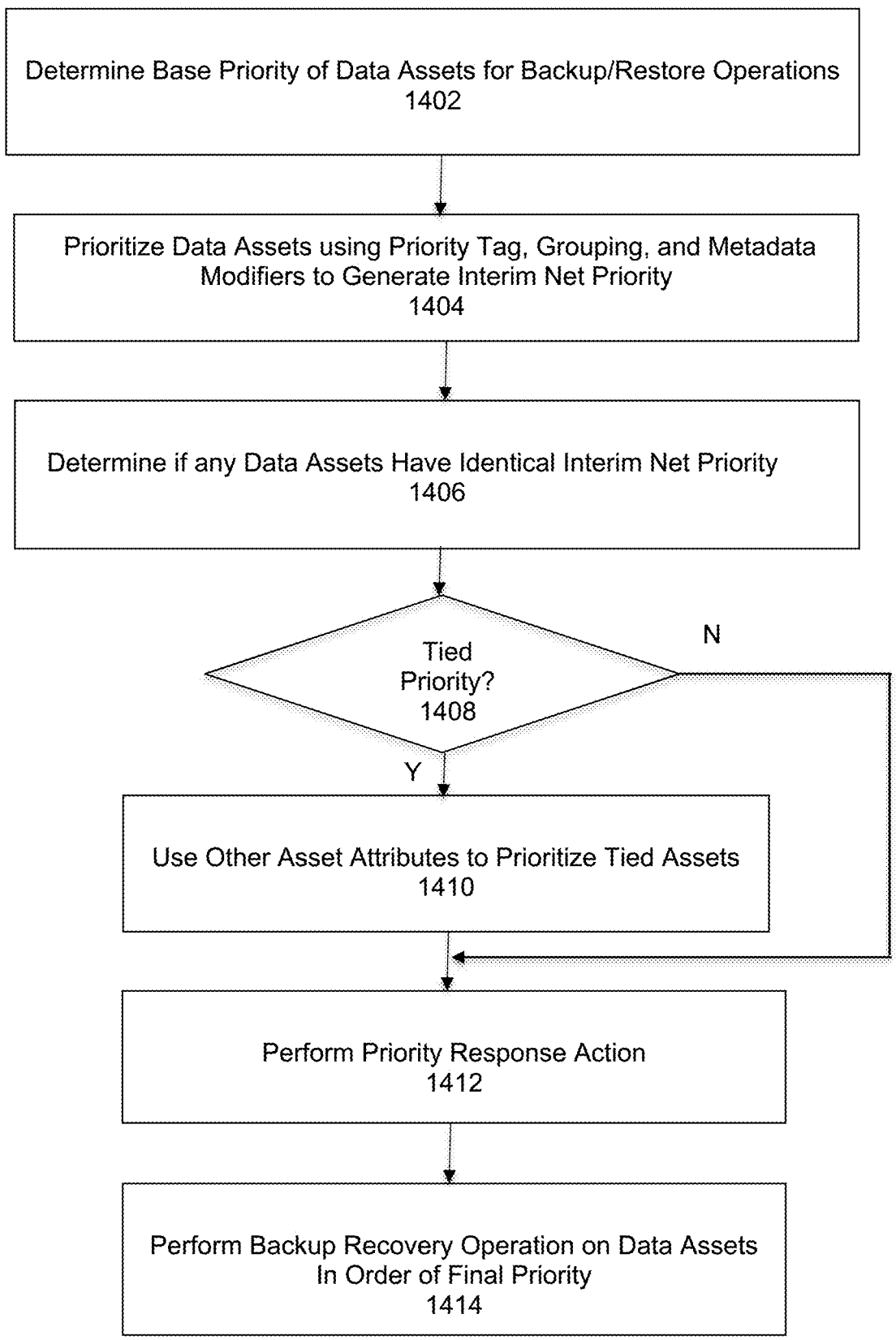
FIG. 14 is a flowchart illustrating a method of prioritizing data protection assets, under some embodiments.

FIG. 14 is a flowchart illustrating a method of prioritizing data protection assets, under some embodiments. As shown in FIG. 14, the process first determines a base priority of data assets operated on by the backup system, 1402. This base priority can be defined by default characteristics, such as file type, backup settings, and so on, along a defined scale. The process then prioritizes certain data assets using priority tagging, grouping factors, and metadata modifiers to generate an interim net priority, 1404. The process next determines if any assets have the same prioritization value, 1406, and if so (as determined in decision block 1408), other asset attributes are used to further prioritize any tied assets, 1406. The process then performs a priority response action, 1412, such as notifying the user (normally or urgently) based on the asset prioritization. The backup/restore operations are then performed on the data assets in an order based on the final prioritization values.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 15:
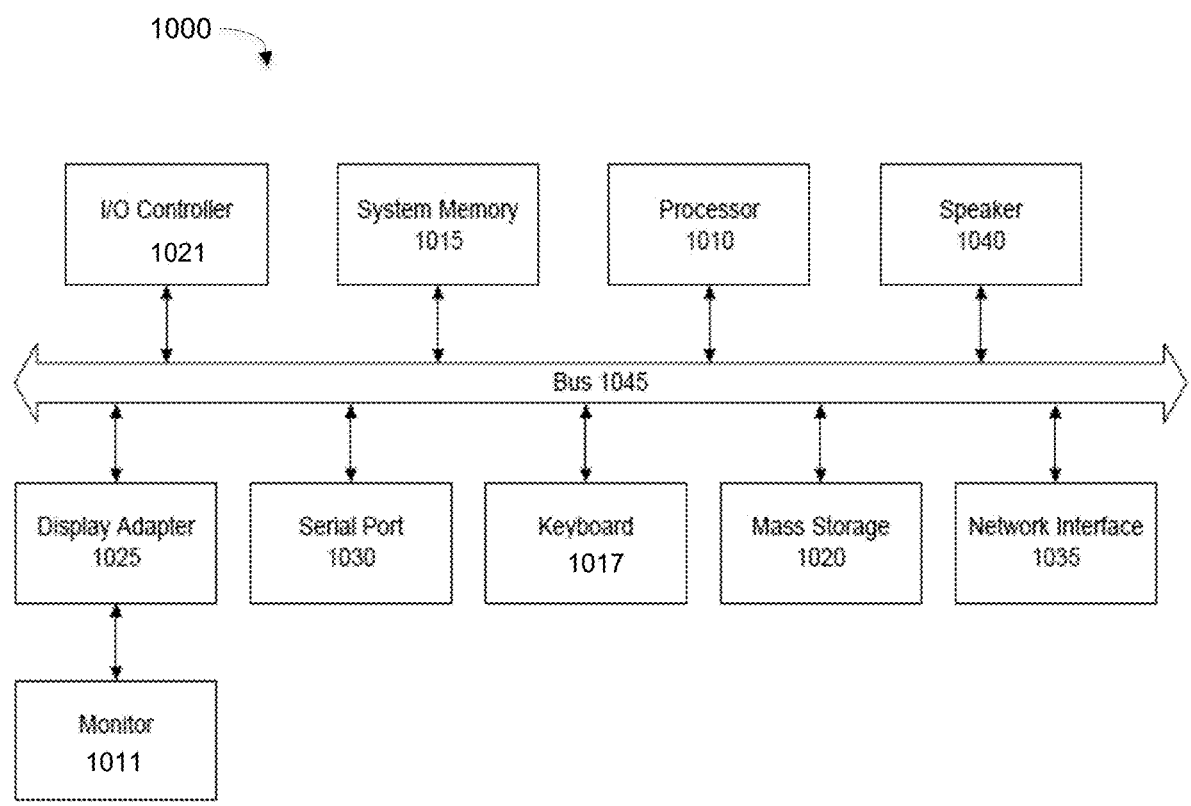
FIG. 15 is a system block diagram of a computer system used to execute one or more software components of a data protection system implementing enhanced prioritization on data assets, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 15 shows a system block diagram of a computer system used to execute one or more software components of the present system described herein. The computer system 1000 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of prioritizing data assets for backup and restore operations in a data protection system, comprising:
   determining a base priority of data assets operated on by the backup system;
   first prioritizing the data assets using priority tagging, grouping factors, and metadata modifiers to generate an interim net priority value for each data asset;
   determining if any data assets have identical priority values;
   second prioritizing any data assets having the identical priority values by using other asset attributes to generate net priority values for each data asset;
   performing a priority response action based on a respective priority value for each data asset; and
   performing the backup or restore operations on the data assets in an order based on the net priority values.

2. The method of claim 1 wherein the data assets comprise at least one of: individual files, file directories, file systems, databases, database servers, data processing applications, and Virtual Machines (VMs) of the data protection system.

3. The method of claim 2 wherein the data assets are organized in one or more hierarchical groups, and wherein the first prioritizing assigns a same base priority value to all data assets in a same hierarchical group.

4. The method of claim 3 wherein the base priority value of one or more lower hierarchy data assets can be modified to a different priority value through at least one of a priority tag, grouping factor, or metadata modifier.

5. The method of claim 4 wherein the priority tagging comprises attaching the priority tag to the data asset as a descriptive string indicating a priority along a scale from high to low in a defined granularity of steps along the scale.

6. The method of claim 5 wherein the scale ranges from 1 to n, with 1 indicating highest priority, and wherein the steps of granularity comprise values of plus/minus 1.

7. The method of claim 6 wherein the priority tag is assigned to the data assets by a user through a graphical user interface-based user console.

8. The method of claim 4 wherein the grouping factor assigns data assets having a first interim net priority value to a second interim net priority value of related data assets based on necessity to perform the backup or restore operations on a unitary set of data assets.

9. The method of claim 4 wherein metadata modifier modifies one or more metadata elements associated with a data asset and comprising at least one of: criticality tag, asset name, storage location, owner, and asset type.

10. The method of claim 9 further comprising parsing metadata of the data assets to discover relevant metadata elements based on one or more key words explicitly or implicitly denoting a criticality of the corresponding data asset.

11. The method of claim 1 wherein the other asset attributes comprise at least one of replication factor and time of last backup.

12. The method of claim 11 wherein a data asset having an earlier time of last backup is prioritized higher than a data asset having the identical priority value and a later time of last backup.

13. The method of claim 1 wherein the priority response action comprises sending a notification to the user regarding the backup or restore operation for a data asset based on the net priority value of the data asset, and relative to a defined prioritization threshold.

14. The method of claim 13 wherein a standard notification is sent for low priority data assets, an immediate notification is sent for elevated priority data assets, and an urgent message is sent for high priority data assets.

15. A system for prioritizing data assets for backup and restore operations in a data protection system, comprising:
   a plurality of data assets each having a base priority for execution by the backup system;
   a net priority component first prioritizing the data assets using priority tagging, grouping factors, and metadata modifiers to generate an interim net priority value for each data asset;
   a processor-based analyzer component determining if any data assets have identical priority values, and if so, second prioritizing any data assets having the identical priority values by using other asset attributes to generate net priority values for each data asset; and a hardware action component performing a priority response action based on a respective priority value for each data asset, wherein the data protection system performs the backup or restore operations on the data assets in an order based on the net priority values.

16. The system of claim 15 wherein the data assets comprise at least one of: individual files, file directories, file systems, databases, database servers, data processing applications, and Virtual Machines (VMs) of the data protection system, and wherein the data assets are organized in one or more hierarchical groups, and wherein the first prioritizing assigns a same base priority value to all data assets in a same hierarchical group.

17. The system of claim 16 wherein the base priority value of one or more lower hierarchy data assets can be modified to a different priority value through at least one of a priority tag, grouping factor, or metadata modifier, and further wherein the priority tagging comprises attaching the priority tag to the data asset as a descriptive string indicating a priority along a scale from high to low in a defined granularity of steps along the scale.

18. The system of claim 16 wherein the grouping factor assigns data assets having a first interim net priority value to a second interim net priority value of related data assets based on necessity to perform the backup or restore operations on a unitary set of data assets, and further wherein metadata modifier modifies one or more metadata elements associated with a data asset and comprising at least one of: criticality tag, asset name, storage location, owner, and asset type.

19. The system of claim 15 wherein the priority response action comprises sending a notification to the user regarding the backup or restore operation for a data asset based on the net priority value of the data asset, and relative to a defined prioritization threshold, and wherein a standard notification is sent for low priority data assets, an immediate notification is sent for elevated priority data assets, and an urgent message is sent for high priority data assets.

20. A tangible computer program product having stored thereon program instructions that, when executed by a process, cause the processor to perform a method of prioritizing data assets for backup and restore operations in a data protection system, comprising:

determining a base priority of data assets operated on by the backup system;

first prioritizing the data assets using priority tagging, grouping factors, and metadata modifiers to generate an interim net priority value for each data asset;

determining if any data assets have identical priority values;

second prioritizing any data assets having the identical priority values by using other asset attributes to generate net priority values for each data asset;

performing a priority response action based on a respective priority value for each data asset; and performing the backup or restore operations on the data assets in an order based on the net priority values.

* * * * *